Sept. 12, 1944. C. J. BURKLEY 2,358,126
METHOD FOR MAKING INNER TUBES
Filed Dec. 20, 1941
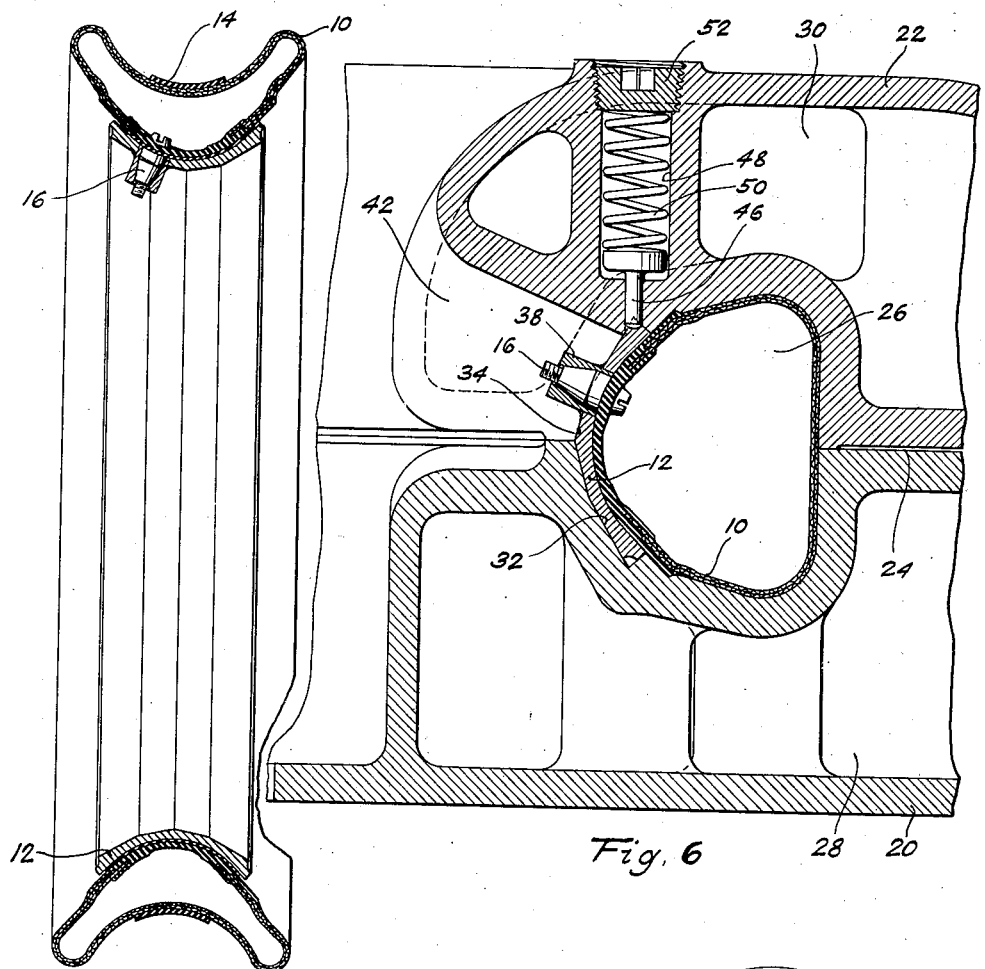
Fig. 4
Fig. 6
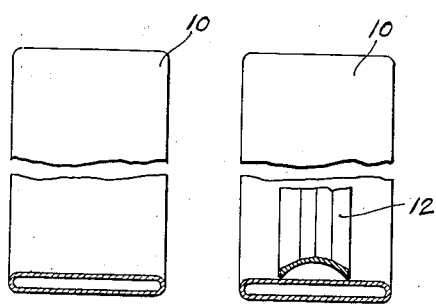
Fig. 1 Fig. 2 Fig. 3
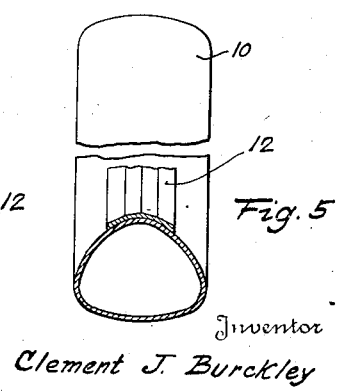
Fig. 5
Inventor
Clement J. Burckley
By
Attorney Patented Sept. 12, 1944

2,358,126

UNITED STATES PATENT OFFICE 2,358,126

METHOD FOR MAKING INNER TUBES

Clement J. Burkley, Akron, Ohio, assignor to Wingfoot Corporation, Akron, Ohio, a corporation of Delaware Application December 20, 1941, Serial No. 423,795

6 Claims. (Cl. 18—56)

This invention relates to methods and apparatus for making inner tubes used with pneumatic tires, and, more particularly, is concerned with improved means and methods for making the carcass or inside tube of a plural-chambered tube of the type shown in Lee Patent No. 2,173,065.

The general object of my invention is the provision of improved methods for facilitating the construction and partial or complete vulcanization of the carcass or inside tube of a plural-chambered inner tube.

Another object of my invention is the provision of a method for building inner tubes and the like, which method is easily performed in a minimum of time by the ordinary workman and without requiring extensive or expensive apparatus to produce high grade uniform products.

The foregoing and other objects of my invention are achieved by the method of making an inner tube or the like which includes the steps of building the inner tube, positioning the unvulcanized inner tube around a base ring, partially inflating the inner tube, yieldably compressing the outer periphery of the tube to force the base thereof inwardly into firm engagement with the base ring, allowing the tube to take a "set" in the position just described, releasing the compressing of the outer periphery of the tube, inflating the tube to substantially toroidal shape and a predetermined size, confining the tube, inflating the tube to high pressure, and vulcanizing the tube while still supported on the base ring.

For a better understanding of my invention, reference should be had to the accompanying drawing, wherein:

Fig. 1 illustrates an inner tube or a carcass of an unvulcanized safety tube in side elevation, with certain portions of the tube being broken away, and with one portion of the tube being shown in section;

Fig. 2 is a view similar to Fig. 1 but illustrating the unvulcanized tube positioned over a base ring;

Fig. 3 is a view similar to Fig. 2, but shows the unvulcanized tube partially inflated on the base ring;

Fig. 4 is a view similar to Figs. 1 to 3, but illustrates on a larger scale and in diametric section the unvulcanized tube partially inflated on the base ring and confined by yieldable compressing means thereon;

Fig. 5 is a view similar to Fig. 3 and shows the unvulcanized tube further inflated to a predetermined size on the base ring and with the yieldable means removed from the outer periphery of the tube; and Fig. 6 is a fragmentary view, in diametric vertical section of the apparatus, of one embodiment of molding apparatus forming a part of my invention.

Although certain of the features of my invention are broadly applicable to the manufacture of rubber bodies of various shapes and usable in a number of relations, my invention is specifically concerned with the manufacture of a carcass or inside tube for a plural-chambered safety tube used with pneumatic tires, and, accordingly, my invention has been so illustrated and will be so described.

The several figures of the drawing indicate substantially in sequence the various operations performed in accordance with the method of my invention. Thus, the numeral 10 indicates an unvulcanized tube or carcass which has been made up by known means and methods, for example, as particularly described in Lee Patent No. 2,090,210, and the resulting tube is of circular extent and has a flattened and cross-sectional contour. In the first step of the method of my invention, the tube 10 is positioned, as shown in Fig. 2, around the outer periphery of a lightweight, radially thin base ring 12, which, in cross-section, has an arcuate shape with the concave side of the base ring being positioned to the radially outer side thereof. The diameter of the base ring 12 is substantially equal to the inside diameter of the inner tube 10 and it is a relatively simple operation to slide the inner tube over the outer periphery of the base ring to position the parts substantially as shown in Fig. 2.

After the base ring and inner tube have been assembled together as last described, I partially inflate the inner tube 10 through the agency of a valve stem 16 which is built into the inner tube 10 in accordance with usual practice. Fig. 3 of the drawing illustrates the relationship of the various parts of the assembly upon partial inflation of the inner tube.

Next in the series of steps incorporated in the method of my invention, means are positioned around the outer periphery of the center of the inner tube to yieldingly compress the outer periphery of the inner tube, and such means may conveniently comprise a relatively wide vulcanized rubber band 14 which is snapped over the outer periphery of the inner tube 10 to cause the parts to be arranged as illustrated in Fig. 4 of the drawing. The application of the rubber band 14 tends to move the base or inner periphery of the inner tube down into firm engagement with the outer periphery of the base ring 12.

The inner tube is allowed to take a "set" for a short length of time and with the parts in the position shown in Fig. 4 of the drawing. Usually, holding the inner tube in the position of Fig. 4 for appproximately one or two minutes will cause the base of the inner tube to adapt itself to the contour of the base ring and the tube will be held against lateral movement with respect to the base ring in subsequent operations. It should be noted here that the inner tube 10 is preferably provided with a guide means, such as a circumferential line, which is accurately aligned with the edge of the base ring 12 just prior to the inflation of the inner tube or immediately thereafter, so that the alignment of the base ring and inner tube is proper and accurate. Of course, the valve stem 16 when received in the base ring 12 assists in the aligning operation.

After the inner tube has taken a "set" in the position shown in Fig. 4, the rubber band 14 is removed and the inner tube is inflated to a predetermined or gauged size and substantially to the toroidal contour illustrated in Fig. 5 of the drawing. During this inflating operation the base of the inner tube is snugly held by the base ring 12, as above described. Thereafter, the base ring with the inner tube 10 carried thereon is positioned in a vulcanizing mold which forms a part of my invention. Inflating the tube to the predetermined or gauged size facilitates the introduction of the tube into the mold cavity without buckling or pinching. The particular embodiment of vulcanizing mold illustrated in Fig. 6 includes a lower mold part 20 and an upper mold part 22 which are joined together substantially at a median plane 24 which passes through the axis of a substantially toroidal cavity 26 formed by complementary openings in adjacent faces of the mold parts. Each mold part is ordinarily jacketed as at 28 and 30 for the reception of steam or other heating fluid.

The mold walls defining the cavity 26 are appropriately recessed as at 32 and 34, to removably receive the base ring 12. It will be noted that the base ring 12, of relatively light weight and of relatively small radial thickness, is closely supported by engagement with the recesses 32 and 34 which contact the radially inward surface of the base ring 12. The radially inward surface of the base ring 12 and the recesses 32 and 34 are positioned obliquely to the plane of the inner tube so that when the base ring is positioned within the mold parts and the mold is closed, there is a tendency to expand the base ring in a radially outward direction to thereby firmly wedge the base ring into centered and aligned position between the mold parts.

The base ring 12 is preferably formed with a valve block 38 which is brazed or otherwise secured to the base ring and which is adapted to receive the valve stem 16 of the inner tube. At least one of the mold parts is provided with an appropriate opening, for example, as indicated by the numeral 42, so that air or other fluid can be passed to the valve stem 16 and thus to the interior of the inner tube during the vulcanizing operation, to hold the inner tube out in firm engagement with the walls of the mold cavity 26.

It is advisable to have the base ring 12 stay in the lower half 20 of the mold after the vulcanizing operation has been carried to the desired stage and the mold is opened. To this end, I provide means which act to separate the base ring 12 from the upper mold half 22 during the opening operation of the mold. Such means, in the form of the invention illustrated, comprise a plunger 46 which is slidably received in a cylinder 48 machined in the mold half 22. The plunger 46 extends into engagement with the upper edge of the base ring 12 in the manner particularly shown in Fig. 6. A compression spring 50 is positioned behind the plunger 46 and a plug 52 removably closes the end of the cylinder 48 and serves to hold the spring 50 in compressed engagement with the plunger 46.

It is believed that the vulcanizing operation performed by the mold illustrated in Fig. 6 will be completely evident from the foregoing description. Suffice it to say here that the base ring 12 with the inner tube 10 mounted thereon, and substantially in the relationship shown in Fig. 5, is positioned in the lower mold part 20 with the upper mold part 22 raised out of position. Thereafter, the upper mold part is lowered into engagement with the lower mold part and the mold parts are held together under the usual high compression, and heating fluid is passed to the jackets 28 and 30 of the mold parts after the inner tube has been inflated firmly into engagement with the inner periphery of the mold cavity 26. Vulcanizing fluid may be passed to the interior of the tube during the vulcanizing operation, although this is ordinarily not done. The closing operation of the mold compresses the spring 50, and the wedging action between the inner periphery of the base ring 12 and the recesses 32 and 34 serves to accurately align and hold the base ring. After the vulcanizing operation has been carried to the desired degreee, which ordinarily is to only semi-cure the inner tube 10 during the manufacture of the inner tube as a carcass for a safety tube, the valve 16 is opened and the mold parts are moved apart. As the mold parts begin to move apart, the plunger 46 under the action of the spring 50 holds the base ring 12 in the lower part of the mold. It will be understood that more than one, and usually three, plungers 46 are provided at circumferentially spaced points around the upper mold part 22. Now the base ring 12 and inner tube 10 can be removed from the lower mold part and the inner tube is then stripped from the base ring 12 which is ready for another operation, all as heretofore described.

From the foregoing, it will be recognized that the objects of my invention have been achieved by the provision of improved methods for making inner tubes and the like, with the methods described being relatively simple, speedy, efficient, and capable of being performed by the ordinary workman without expensive or delicate apparatus, which methods produce high grade work of uniform quality.

I may change the exact sequence of the method steps heretofore described. For example, instead of partially inflating the inner tube and then compressing the outer periphery of the tube as above set forth, I may mount the tube on the base ring, resiliently hold the outer periphery of the tube against free expansion, as by the use of the band 14, and then partially inflate the inner tube to force its inner periphery into "setting" engagement with the base ring.

While in accordance with the patent statutes I have specifically illustrated and described my invention, I am not to be limited thereto or thereby, as the scope of my invention is defined in the appended claims.

What I claim is:

1. That method of making an inner tube which includes the steps of building the inner tube, positioning the unvulcanized inner tube around a base ring, partially inflating the inner tube, yieldably compressing the outer periphery of the tube by reducing the central circumferential dimension thereof to less than its partially inflated dimension to force the base of the tube inwardly into firm engagement with the base ring, allowing the tube to take a set in the position just described, releasing the compressing of the outer periphery of the tube, inflating the tube to substantially toroidal shape and a predetermined size, confining the inner tube, fully inflating the inner tube, and vulcanizing the tube while still supported on the base ring.

2. That method of making an inner tube which includes the steps of building the inner tube, positioning the unvulcanized inner tube around a base ring, partially inflating the inner tube, yieldably compressing the outer periphery of the tube by reducing the central circumferential dimension thereof to less than its partially inflated dimension to force the base of the tube inwardly into firm engagement with the base ring, allowing the tube to take a set in the position just described, releasing the compressing of the outer periphery of the tube, inflating the tube to substantially toroidal shape, and vulcanizing the tube.

3. That method of making an inner tube which includes the steps of positioning the unvulcanized inner tube around a base ring, yieldably gripping the periphery of the tube to hold the central circumference thereof to a dimension less than the central circumference thereof in inflated form, partially inflating the tube to force the base thereof inwardly into firm engagement with the base ring, releasing the gripping of the outer periphery of the tube, inflating the tube to substantially toroidal shape while still on the base ring, and vulcanizing the tube while still supported on the base ring.

4. That method of making an inner tube which includes the steps of building the endless unvulcanized inner tube, yieldably holding the outer periphery of the center of the flattened tube against expansion, partially inflating the inner tube to force the base thereof radially inwardly, allowing the tube to take a set in the position just described, releasing the holding of the outer periphery of the tube, inflating the tube to substantially toroidal shape, and vulcanizing the tube.

5. That method of making an inner tube, or the like, which includes the steps of building the unvulcanized inner tube, partially inflating the inner tube, compressing the outer periphery of the tube by materially reducing the circumferential length of at least the center of the partially inflated tube to force the base thereof radially inwardly, releasing the compressing of the outer periphery of the tube, fully inflating the tube, and vulcanizing the tube.

6. That method of making a rubber inner tube for pneumatic tires which includes the steps of building an endless unvulcanized inner tube, mounting the tube on a base ring, pneumatically forcing the base of the tube into engagement with the base ring while the outside of the tube is confined, retaining the tube in the last-noted position until it has taken a set, releasing the confining of the tube, inflating the tube to toric shape, and vulcanizing the tube while still mounted on the base ring.

CLEMENT J. BURKLEY.